United States Patent [19]

Kenton

[11] 4,356,021
[45] Oct. 26, 1982

[54] LIQUID FERTILIZER SOLUTION CONTAINING ZINC

[75] Inventor: Joseph R. Kenton, Bartlesville, Okla.

[73] Assignee: Phillips Petroleum Company, Bartlesville, Okla.

[21] Appl. No.: 221,681

[22] Filed: Dec. 30, 1980

[51] Int. Cl.³ ............................ C05G 1/06; C05C 9/00
[52] U.S. Cl. ........................................ 71/30; 71/34; 71/59; 71/61; 71/63; 71/64.08; 71/64.10
[58] Field of Search ............... 71/1, 31, 61, 63, 64.10, 71/DIG. 2, DIG. 4, 28–30, 34, 54, 59, 60, 64.08; 423/265, 352, 514, 545, 622; 252/430, 440, 447, 387, 388; 422/13, 14

[56] References Cited

U.S. PATENT DOCUMENTS

| | | | |
|---|---|---|---|
| 3,520,651 | 7/1970 | Philen | 23/50 |
| 3,620,708 | 11/1971 | Ott | 71/33 |
| 3,951,639 | 4/1976 | Windgassen | 71/27 |
| 3,981,713 | 9/1976 | Tucker | 71/28 |
| 4,210,437 | 7/1980 | Windgassen et al. | 71/63 |
| 4,239,522 | 12/1980 | Wilson | 71/29 |

*Primary Examiner*—Ferris H. Lander

[57] ABSTRACT

A homogeneous, zinc-containing liquid fertilizer concentrate is prepared by mixing, in aqueous solution, ammonium thiosulfate and zinc oxide. This zinc-containing concentrate is suitable for mixing with a liquid fertilizer preparation such as aqueous ammonium polyphosphate to prepare a complete zinc-containing fertilizer solution. The nutrient value of the concentrate and the fertilizer can be enhanced by the addition of a potassium salt or nitrogen solution. The long-term stability of the fertilizer solution can be improved by the addition of attapulgus clay.

19 Claims, No Drawings

LIQUID FERTILIZER SOLUTION CONTAINING ZINC

BACKGROUND OF THE INVENTION

This invention relates to liquid fertilizer solutions. It further relates to liquid fertilizer solutions containing zinc and to methods of preparing such fertilizer solutions. In another aspect, the invention relates to methods of stabilizing zinc-containing fertilizer solutions against solids precipitation.

Liquid fertilizers have been used for many years to provide plant nutrients in a form which can be easily assimilated by plants and can be easily and evenly applied either into the soil or directly onto the plants. A problem encountered in the preparation and use of liquid fertilizers is the difficulty of maintaining the complete solubility of all the components of the fertilizer solution. To minimize the number of separate applications necessary to provide the necessary nutrients, it is desirable to include as many nutrients as possible in a single fertilizer solution, but each nutrient must be introduced in a manner and from a source which does not disrupt the mutual solubility of all the components. The precipitation or crystallization of solids from the fertilizer solution causes plugging of storage and application equipment, resulting in uneven distribution of the liquid during application, costly maintenance of storage facilities, and loss of the precipitated nutrient from the solution.

Zinc is an important plant nutrient which must sometimes be applied on a wide scale to crops such as corn. Zinc-containing fertilizer solutions, particularly those in which other nutrients such as sulfur, nitrogen, phosphorus, and potassium are present, exhibit stability problems which must be overcome to provide an economical, effective fertilizer. In the past, zinc chelates have been used as zinc sources for liquid fertilizers. Although these zinc sources have shown good stability in liquid fertilizer solutions, zinc chelates are very expensive zinc sources, making it desirable to find stable substituents for these zinc sources, particularly for large-scale agricultural uses. A less expensive source of zinc which has been tried is zinc carbonate, but the process of mixing this compound with a liquid polyphosphate solution to form a complete fertilizer results in considerable foaming and is very time consuming.

It is therefore an object of this invention to provide a liquid fertilizer solution containing zinc.

It is a further object to provide a stable zinc-containing concentrate which can be mixed with a liquid fertilizer solution to prepare a liquid fertilizer containing zinc and other nutrients.

It is a further object to provide a method of preparing a stable zinc-containing fertilizer solution.

It is a further object to provide a method of preparing a stable zinc-containing fertilizer solution using a relatively inexpensive source of zinc.

SUMMARY OF THE INVENTION

According to the invention, a homogeneous, zinc-containing liquid fertilizer concentrate is prepared by mixing, in aqueous solution, ammonium thiosulfate and zinc oxide. This zinc-containing concentrate is suitable for mixing with a liquid fertilizer such as aqueous ammonium polyphosphate to prepare a complete zinc-containing fertilizer solution. The nutrient value of the concentrate and the fertilizer can be enhanced by the addition of a potassium salt and/or a nitrogen solution. The long-term stability of the fertilizer solution can be improved by the addition of attapulgus clay.

DETAILED DESCRIPTION OF THE INVENTION

The homogeneous, zinc-containing liquid fertilizer concentrates of the invention are prepared by mixing, in aqueous solution, an ammonium thiosulfate and zinc oxide. This zinc-containing fertilizer concentrate is stable, i.e., resistant to solids-formation by crystallization or precipitation, and is easily mixed with prepared liquid fertilizers to form complete zinc-containing fertilizer solutions.

The zinc oxide used in the invention compositions and preparation process may be coated or uncoated. The zinc content of the final fertilizer composition can vary from a trace, e.g. 0.01 weight percent, to about 2.5 weight percent and is preferably in the range of about 0.1 to about 1.5 weight percent.

The zinc oxide is mixed with ammonium thiosulfate, preferably in aqueous solution. The ammonium thiosulfate serves as a source of sulfur and as a complexing agent for the zinc. The minimum amount of ammonium thiosulfate in the solution is based upon the amount of zinc oxide employed. The minimum amount of ammonium thiosulfate is generally about 2 moles of ammonium thiosulfate for each mole of zinc oxide, which results in essentially complete complexing of the zinc, ensuring good solubility of the zinc in the solution. The amount of sulfur present in the fertilizer concentrate can vary widely but will generally be in the range of about 0.01 to about 7 weight percent, preferably about 1 to about 5 weight percent.

It has been found preferable when using ZnO as a zinc micronutrient source for liquid fertilizers, such as aqueous ammonium phosphate, to form a zinc-thiosulfate complex prior to addition of the zinc to the fertilizer solution. ZnO added directly to an ammonium polyphosphate solution can produce solids which can be incorporated into a homogeneous formulation only after vigorous, time-consuming mixing. Although the fertilizer solution could be prepared by adding ZnO to the liquid fertilizer, either followed or preceded by the requisite amount of ammonium thiosulfate, the preferred manner of mixing is by first preparing the zinc oxide and ammonium thiosulfate concentrate.

The ammonium-sulfur complex solution can be mixed with a source of nitrogen. The amount of nitrogen in the nitrogen-containing compound or compounds depends entirely upon the amount of nitrogen desired in the final fertilizer solution. A commercial preparation called Sol'N 32 ® is representative of the nitrogen sources suitable for the invention fertilizer. Sol'N 32 is a solution of about 46.7 weight percent ammonium nitrate and about 33.6 weight percent urea in about 19.7 weight percent water, formulated to contain about 28 or 32 percent nitrogen by weight with a maximum salting out temperature of 32° F.

If the Sol'N 32 type of nitrogen source is used in the preparation of the liquid fertilizer, the preferred method of forming the zinc-containing starting solution for the liquid fertilizer is to mix the desired amount of the nitrogen source with ammonium thiosulfate in deionized water. The zinc oxide is then mixed into this solution to form a zinc oxide concentrate. It is preferable to warm the mixture at a temperature below 100° C. during the mixing, and to filter the solution afterwards to remove traces of solid. The amounts of each component added depend upon the desired nutrient level in the final fertilizer solution, so long as the mole ratio of ammonium thiosulfate to zinc oxide is at least 2:1 to provide complete solubilization of the zinc complex.

Potassium can be added to this zinc-containing concentrate in the form of a soluble potassium compound in an amount dependent upon the amount of potassium nutrient desired in the fertilizer. The preferred sources of the potassium nutrient are soluble potassium salts such as potassium chloride and potassium nitrate because of their availability and cost. Other sources of potassium include, for example, potassium iodide, potassium bromide, potassium hydroxide, potassium carbonate, potassium phosphate, and potassium sulfate.

A complete liquid mixed fertilizer solution containing the nutrients generally desired for crop application can be prepared by mixing the zinc-containing concentrate with an ammonium phosphate solution. Commercial ammonium phosphate solutions are often referred to by terms such as "10-34-0" which describe the weight percent of nitrogen content as N, phosphorus calculated as $P_2O_5$, and potassium calculated as $K_2O$, respectively. Commercial ammonium polyphosphate solutions generally contain about 9 to 11 weight percent nitrogen and 30 to 37 weight percent $P_2O_5$ (equivalent), based on the total ammonium polyphosphate solution. The $P_2O_5$ (equivalent) present as polyphosphate depends on the acid source used in preparing the ammonium polyphosphate but is usually about 65.75% of the total $P_2O_5$ (equivalent) present, the remainder of the $P_2O_5$ (equivalent) being present as orthophosphate. The presently preferred ammonium phosphate component of the fertilizer is an aqueous solution having at least 50 weight percent total ammonium phosphates, including ammonium polyphosphates and orthophosphates. When the liquid fertilizer contains $P_2O_5$, the weight ratio of poly $P_2O_5$:Zn should be at least about 6:1 to provide adequate stability to the final liquid fertilizer solution.

In order to increase the long-term stability of the invention fertilizer solutions, various types of clays, such as attapulgite clay, bentonite clay and diatomaceous earth, can be used as suspension agents. Attapulgite clay, for example, has been found effective for use in the invention fertilizer solutions to prevent the formation of density-packed precipitate. The amount of clay used will generally be within the range of about 0.01 to about 1.0 weight percent, based on the weight of the final fertilizer composition.

EXAMPLE I

This example is a control run to illustrate the problems with fertilizer stability resulting from the use of $ZnSO_4$ as the source of the zinc micronutrient.

Into a 30-mL screw-capped glass vial was placed 27.3 g of a liquid fertilizer composition containing 20 g of 10-34-0 liquid fertilizer, 4.69 g $ZnSO_4.7\ H_2O$, and 2.61 g $H_2O$. The vial was closed and mechanically shaken for 10-30 minutes at room temperature to dissolve the $ZnSO_4.7\ H_2O$. After 24 hours at room temperature, the amount of precipitate was measured with a metric ruler and found to be about 51 volume percent. The experiment was repeated using varying amounts of $ZnSO_4.7\ H_2O$ and water but a constant total sample weight of 27.3 grams.

As shown in Table I, a poly $P_2O_5$:Zn mole ratio of greater than about 3:1 was necessary to obtain a liquid fertilizer which was free of precipitated solids after 24 hours. However, even those samples initially free of solids developed precipitates after standing for 2–3 weeks.

TABLE I

| | Stability of Liquid Fertilizer Solution Containing $ZnSO_4$ | | | | |
|---|---|---|---|---|---|
| 10-34-0[b] | $ZnSO_4.7\ H_2O$ | $H_2O$ | 10-34-0:$ZnSO_4.7\ H_2O$ | Poly $P_2O_5$:Zn | Precipitate, |
| | Wt., Grams | | Wt. Ratio | Mole Ratio | Vol. %[a] |
| 20 | 4.69 | 2.61 | 4.26 | 2.00 | 51 |
| 20 | 4.13 | 3.17 | 4.84 | 2.25 | 47 |
| 20 | 3.93 | 3.37 | 5.09 | 2.36 | 36 |
| 20 | 3.76 | 3.54 | 5.32 | 2.47 | 28 |
| 20 | 3.59 | 3.71 | 5.57 | 2.59 | 23 |
| 20 | 3.44 | 3.86 | 5.81 | 2.70 | 23 |
| 20 | 3.30 | 4.00 | 6.06 | 2.82 | 10 |
| 20 | 3.18 | 4.12 | 6.29 | 2.92 | 2 |
| 20 | 3.06 | 4.24 | 6.54 | 3.04 | trace |
| 20 | 2.95 | 4.35 | 6.78 | 3.15 | 0[c] |
| 20 | 2.85 | 4.45 | 7.02 | 3.26 | 0[c] |

[a]Precipitate after 24 hrs. at 25° C.
[b]10-34-0 (67.5% conversion)
[c]Develops precipitate after 2-3 weeks aging

EXAMPLE II

This example is a control run illustrating the use of $ZnSO_4\ 7\ H_2O$ as the source of zinc micronutrient in mixed liquid fertilizer solutions. Ammonium thiosulfate, $(NH_4)_2S_2O_3$ was used as a solubilizer. Four liquid mixed fertilizer formulations containing zinc sulfate and varying amounts of KCl were prepared and observed for solids as described in Example I. These formulations are shown in Table II. A premix containing 451 g $(NH_4)_2S_2O_3$ (60.1 weight percent), 15 g Sol'N 32 (2.0 weight percent), and 284 g deionized water (37.9 weight percent) was prepared and filtered to remove trace solids. Zinc sulfate, potassium chloride and 10-34-0 were added to the premix so as to give the compositions shown in Table II. The formulations were essentially precipitate-free when prepared, but after 3 weeks at room temperature each sample contained more than 10 volume percent solids.

TABLE II

Compositions of Four Liquid Fertilizer Formulations Containing Zinc Sulfate

| Ingredients | Formulation 8-20-5-4S-1Zn | 8-20-4-4S-1Zn | 8-20-3-4S-1Zn | 8-20-3-4S-2Zn |
|---|---|---|---|---|
| | Wt. % | | | |
| 10-34-0[a] | 58.80 | 58.80 | 58.80 | 58.80 |
| KCl | 8.05 | 6.45 | 4.84 | 4.84 |
| Sol'N 32[b] | 1.82 | 1.82 | 1.82 | 2.50 |
| $(NH_4)_2S_2O_3$[c] | 13.50 | 13.50 | 13.50 | 11.62 |
| $ZnSO_4 \cdot 7 H_2O$ | 4.40 | 4.40 | 4.40 | 8.80 |
| $H_2O$ | 13.43 | 15.03 | 16.64 | 13.44 |

[a]67.5% Conversion.
[b]Laboratory-prepared containing 46.7 weight percent $NH_4NO_3$, 33.6 weight percent $H_2NCONH_2$, 19.7 weight percent $H_2O$ having a nitrogen content of 32 weight percent and a salting-out temperature of 32° F.
[c]60.1 Weight percent solution (12-0-0-26S).

EXAMPLE III

This example describes the preparation of an invention composition using zinc oxide as the source of the zinc micronutrient. A zinc oxide concentrate solution was prepared by warming 214.6 g of the Thiosul solution (85.8 weight percent) described in Example II and 35.4 g ZnO (14.2 weight percent) and filtering the warm solution to remove traces of solid. This was used as a stock solution to which were added additional ingredients including KCl, Sol'N 32, 10-34-0, and water. The resulting formulations had varying amounts of KCl, expressed as $K_2O$ in Table III. The solutions were initially clear, homogeneous liquids, but after 16 days at room temperature developed a slight haze with a trace of precipitate. These formulations were considered to be satisfactory liquid fertilizers. After 100 days, slightly more precipitate (about 1 volume percent) formed, but the system was considered satisfactory as compared with the $ZnSo_4$-containing compositions described in Examples I and II. The compositions of these relatively stable zinc-containing fertilizers are shown in Table III.

TABLE III

Compositions of Three Liquid Fertilizer Formulations Containing Zinc Oxide

| Ingredient | Formulation 8-20-5-3.5S-1Zn | 8-20-4-3.5S-1Zn | 8-20-3-3.5S-1Zn |
|---|---|---|---|
| | Wt. % | | |
| 10-34-0[a] | 58.8 | 58.8 | 58.8 |
| KCl | 8.05 | 6.45 | 4.84 |
| Sol'N 32 | 1.80 | 1.82 | 1.82 |
| $(NH_4)_2S_2O_3$[b] | 13.50 | 13.50 | 13.50 |
| ZnO | 1.25 | 1.25 | 1.25 |
| $H_2O$ | 16.60 | 18.20 | 19.80 |

[a]67.5% Conversion.
[b]60.1 Weight percent solution (12-0-0-26S).

EXAMPLE IV

This example describes the preparation of an invention fertilizer containing zinc in which Attapulgus clay (Attaflow ® available from Englehard Minerals and Chemicals) was added to the formulations to suspend the solids which formed after aging.

Liquid mixed fertilizer compositions having various amounts of zinc available as zinc oxide were prepared as previously described. These compositions are listed in Table IV.

TABLE IV

Liquid Fertilizer Containing Various Amounts of Zinc

| Ingredients | Formulations, grams 0.1 Zn | 0.5 Zn | 1.0 Zn |
|---|---|---|---|
| 10-34-0 (67.5% Conversion) | 123.5 | 123.5 | 123.5 |
| KCl | 11.1 | 11.1 | 11.1 |
| Sol'N 32 | 111.1 | 111.1 | 111.1 |
| Thiosul Solution | 64.7 | 54.1 | 41.0 |
| ZnO Concentrate | 3.1 | 15.4 | 30.7 |
| $H_2O$ | 34.3 | 32.5 | 30.3 |

Each of the formulations was then divided into 3 equal portions. To the first portion was added 0.64 grams of water. To the second divided portion was added 0.64 grams of a 50-weight percent aqueous dispersion of Attaflow ® clay additive (0.07 weight percent attapulgus clay on dry weight basis). Each sample was mechanically shaken for a few minutes and allowed to stand at room temperature. After 40 days it was observed that only the sample having the composition 16-12-2-5S-1.0-Zn in which there was no attapulgus clay had a solid layer not easily dispersed. The other samples had a clay-solid suspension which did not pack to the bottom of the container and was easily dispersed. The experiment was repeated using the same levels of zinc but different amounts of the other ingredients. The results shown in Table V indicate that compositions having the highest zinc concentration (1 weight percent) and lowest $P_2O_5$ content (7 and 12 weight percent) were the least stable. However, attapulgus clay (0.7–0.14 weight percent) were the least stable. However, attapulgus clay (0.07–0.14 weight percent) was effective in preventing the formation of densely-packed precipitate. Data using formulations from Table IV are also listed in Table V for comparison.

TABLE V

Stability of Liquid Fertilizer Solutions Containing Different Concentrations of Zinc and Attapulgus Clay

| Composition | Wt. % Attapulgus Clay 0 | 0.07 | 0.14 |
|---|---|---|---|
| 18-14-0-5S-0.1 Zn | A | A | A |
| 18-14-0-5S-0.5 Zn | A | A | A |
| 18-14-0-5S-1.0 Zn | A | A | A |
| 16-12-2-5S-0.1 Zn | A | A | A |
| 16-12-2-5S-0.5 Zn | A | A | A |
| 16-12-2-5S-1.0 Zn | C | A | A |
| 9-7-6-7S-0.1 Zn | A | A | A |
| 9-7-6-7S-0.5 Zn | A | A | A |
| 9-7-6-7S-1.0 Zn | C | B | B |
| 8-20-4-4S-0.1 Zn | A | A | A |
| 8-20-4-4S-0.5 Zn | A | A | A |

TABLE V-continued

Stability of Liquid Fertilizer Solutions
Containing Different Concentrations
of Zinc and Attapulgus Clay

| Composition | Wt. % Attapulgus Clay | | |
|---|---|---|---|
| | 0 | 0.07 | 0.14 |
| 8-20-4-4S-1.0 Zn | A | A | A |

A = Easily dispersed
B = Easily dispersed but contains solids that quickly resettle
C = Solid layer not easily dispersed Table VI below provides a summary of stability tests for liquid fertilizer solutions containing zinc. The results indicate that zinc sulfate is an unacceptable source of stable zinc while zinc oxide formulations are relatively stable liquid fertilizers, particularly with added attapulgus clay.

TABLE VI

Relative Stability of $ZnSO_4$ and ZnO Liquid Fertilizer Solutions

| No.[f] | Composition | Wt. % | | | | | | | | Ppt. After 3 Weeks at 25° C. |
|---|---|---|---|---|---|---|---|---|---|---|
| | | 10-34-0[a] | KCl | Sol'N 32[b] | Thiosul Solution[c] | $ZnSO_4$ 7 $H_2O$ | ZnO | $H_2O$ | Clay[d] | |
| 1 | 8-20-5-4S-1 Zn | 58.8 | 8.05 | 1.82 | 13.5 | 4.4 | — | 13.43 | — | Yes |
| 2 | 8-20-4-4S-1 Zn | 58.8 | 6.45 | 1.82 | 13.5 | 4.4 | — | 15.03 | — | Yes |
| 3 | 8-20-3-4S-1 Zn | 58.8 | 4.84 | 1.82 | 13.5 | 4.4 | — | 16.64 | — | Yes |
| 4 | 8-20-3-4S-2 Zn | 58.8 | 4.84 | 2.50 | 11.62 | 8.8 | — | 13.44 | — | Yes |
| 5 | 8-20-5-3.5S-1 Zn | 58.8 | 8.05 | 1.80 | 13.5 | — | 1.25 | 16.6 | — | trace |
| 6 | 8-20-4-3.5S-1 Zn | 58.8 | 6.45 | 1.80 | 13.5 | — | 1.25 | 18.2 | — | trace |
| 7 | 8-20-3-3.5S-1 Zn | 58.8 | 4.84 | 1.81 | 13.5 | — | 1.25 | 19.8 | — | trace |
| 8 | 8-20-4-4S-0.1 Zn | 58.8 | 6.34 | 0.86 | 15.38 | — | 0.12[e] | 18.36 | 0.14 | No |
| 9 | 8-20-4-4S-0.5 Zn | 58.8 | 6.34 | 0.86 | 15.38 | — | 0.62[e] | 17.86 | 0.14 | No |
| 10 | 8-20-4-4S-1 Zn | 58.8 | 6.34 | 0.86 | 15.38 | — | 1.25[e] | 17.23 | 0.14 | No |

[a]Ammonium polyphosphate solution (67.5% conversion). and 19.7 wt. % water.
[c]60.1 wt. % $(NH_4)_2S_2O_3$, 2.0 wt. % Sol'N 32, 37.9 wt. % $H_2O$ (12-0-0-26).
[d]Attapulgus clay.
[e]ZnO added as a zinc concentrate solution containing 14.2 wt. % ZnO and 85.8 wt. % Thiosul solution.
[f]Nos. 1 through 4 are equivalent to Example II. Nos. 5 through 7 are equivalent to Example III. Nos. 8 through 10 are equivalent to Example IV, Table V.

That which is claimed is:

1. A method for preparing a liquid fertilizer concentrate comprising mixing, in an aqueous medium in the substantial absence of free ammonia, zinc oxide and ammonium thiosulfate, the mole ratio of ammonium thiosulfate to zinc oxide being at least about 2:1.

2. The method of claim 1 which further comprises the admixing of a water-soluble potassium salt in the aqueous medium.

3. The method of claim 2 in which the potassium salt is potassium chloride.

4. The method of claim 1 which further comprises the admixing of a nitrogen composition selected from ammonium nitrate, urea and mixtures of these in the aqueous medium.

5. The method of claim 4 in which the nitrogen composition is an aqueous solution of ammonium nitrate and urea.

6. The method of claim 4 which further comprises the admixing of a water-soluble potassium salt in the aqueous medium.

7. The method of claim 6 in which the potassium salt is potassium chloride and the nitrogen composition is an aqueous solution of ammonium nitrate and urea.

8. A method for preparing a liquid fertilizer solution comprising the steps of:
(a) mixing, in aqueous solution in the substantial absence of free ammonia, ammonium thiosulfate and zinc oxide in a molar ratio of at least about 2:1 to form a substantially homogeneous aqueous fertilizer concentrate; and
(b) mixing the thus-formed aqueous fertilizer concentrate with an aqueous ammonium polyphosphate solution in an amount such that the molar ratio of polyphosphate to zinc in the resulting solution is at least about 6:1.

9. The method of claim 8 in which the aqueous ammonium phosphate solution contains at least about 50 weight percent ammonium phosphates.

10. The method of claim 9 in which the aqueous ammonium phosphate solution contains about 9 to about 11 weight percent nitrogen and about 30 to about 37 weight percent $P_2O_5$ (equivalent).

11. The method of claim 8 in which step (a) further comprises admixing a water-soluble potassium salt in the aqueous fertilizer concentrate.

12. The method of claim 11 in which the potassium salt is potassium chloride.

13. The method of claim 8 or claim 11 in which step (a) further comprises admixing a nitrogen composition selected from ammonium nitrate, urea and mixtures of these in the aqueous fertilizer concentrate.

14. The product of the process of claim 13.

15. The method of claim 8 in which the zinc oxide is used in an amount so as to provide an amount of zinc in the liquid fertilizer solution within the range of about 0.01 to about 2.5 weight percent based on the weight of the liquid fertilizer solution.

16. The method of claim 15 in which the amount of zinc is within the range of about 0.1 to about 1.5 weight percent based on the weight of the liquid fertilizer solution.

17. The method of claim 8 which further comprises adding an amount of attapulgus clay effective to inhibit solids formation in the liquid fertilizer solution.

18. A composition comprising the product of mixing, in aqueous solution, ammonium thiosulfate and zinc oxide in a molar ratio of at least about 2:1.

19. A liquid fertilizer composition comprising the product of mixing the composition of claim 18 with an aqueous ammonium polyphosphate solution so as to provide a molar ratio of poly $P_2O_5$ to zinc of at least about 6:1 and an amount of zinc in the range of about 0.01 to about 2.5 weight percent.

* * * * *